(12) United States Patent  
Scheffel

(10) Patent No.: US 6,669,168 B2
(45) Date of Patent: Dec. 30, 2003

(54) QUICK CONNECT COUPLING

(75) Inventor: Gary Scheffel, Streetsboro, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 10/156,246

(22) Filed: May 28, 2002

(65) Prior Publication Data

US 2003/0172976 A1 Sep. 18, 2003

Related U.S. Application Data

(60) Provisional application No. 60/363,990, filed on Mar. 13, 2002.

(51) Int. Cl.$^7$ ................................................. F16L 37/30
(52) U.S. Cl. ............................ 251/149.6; 137/614.03; 137/614.04
(58) Field of Search .................... 137/614.04, 614.03, 137/614.05; 251/149.6, 149.1

(56) References Cited

U.S. PATENT DOCUMENTS

| 4,378,028 A | | 3/1983 | Weber et al. | |
|---|---|---|---|---|
| 5,215,122 A | * | 6/1993 | Rogers et al. | 137/614.04 |
| 5,445,358 A | * | 8/1995 | Anderson | 251/149.6 |

FOREIGN PATENT DOCUMENTS

| FR | 1214691 | 4/1960 |
|---|---|---|
| GB | 898955 | 6/1962 |

* cited by examiner

Primary Examiner—Kevin Lee
(74) Attorney, Agent, or Firm—Calfee, Halter & Griswold LLP

(57) ABSTRACT

A quick connect coupling includes a male coupling component and a female coupling component that axially interfit in a locked and unlocked relationship with each other with the female coupling component having a hollow body, a tubular body extension that extends axially from a first end of the hollow body and a valve element that can translate along a longitudinal axis of the quick connect coupling. The male coupling component has a tubular stem portion that translates the valve element when the quick connect coupling is fully assembled to a locked position. A valve seat member disposed within the female coupling component has a tapered valve seat area that cooperates with a poppet valve. The valve seat member has a generally cylindrical body with a generally cylindrical inner surface adapted to receive a first end of said tubular stem portion, the valve seat member also having a generally cylindrical outer surface. The valve seat member includes a seal in a recess of the outer surface and a seal in a recess in an inner surface thereof. The tubular body extension is an unwetted part.

21 Claims, 3 Drawing Sheets

QUICK CONNECT COUPLING

RELATED APPLICATION

This application claims the benefit of U.S. provisional patent application serial No. 60/363,990 filed on Mar. 13, 2002 for QUICK CONNECT, the entire disclosure of the which is fully incorporated herein by reference.

TECHNICAL FIELD OF THE INVENTION

The present invention relates to quick connect tube couplings. More particularly, the invention relates to a quick connect tube coupling that utilizes fewer seals and is easier to manufacture.

BACKGROUND OF THE INVENTION

Quick connect tube couplings are well known in the art. One type of quick connect tube coupling that has found substantial commercial success is disclosed in U.S. Pat. No. 4,378,028, the entire disclosure of which is fully incorporated herein by reference. The present invention is directed to improvements in the coupling described therein to reduce the number of seals and sealing surfaces, thereby simplifying manufacturing processes and reducing costs without any compromise in performance of the coupling.

SUMMARY OF THE INVENTION

In accordance with one aspect of the invention, a quick connect coupling includes a valve seat member that has only two seals for providing a body seal against fluid pressure. In one embodiment, the valve seat member includes an outer surface with a seal groove therein and an inner surface with a seal groove therein. The seals are radially compressed within these seal grooves. Reducing the number of seals and seal surfaces simplifies manufacturing and thereby lowers cost.

In accordance with another aspect of the invention, a valve seat member is provided that seals against fluid pressure in such a way that a body extension of the female coupling component is not a wetted part. In one embodiment, an inner seal seals against an outer surface of a tubular stem portion of the male coupling member, and an outer seal seals against an inner surface of the female coupling body.

These and other aspects and advantages of the present invention will be apparent to anyone skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENTS

Figure 1:
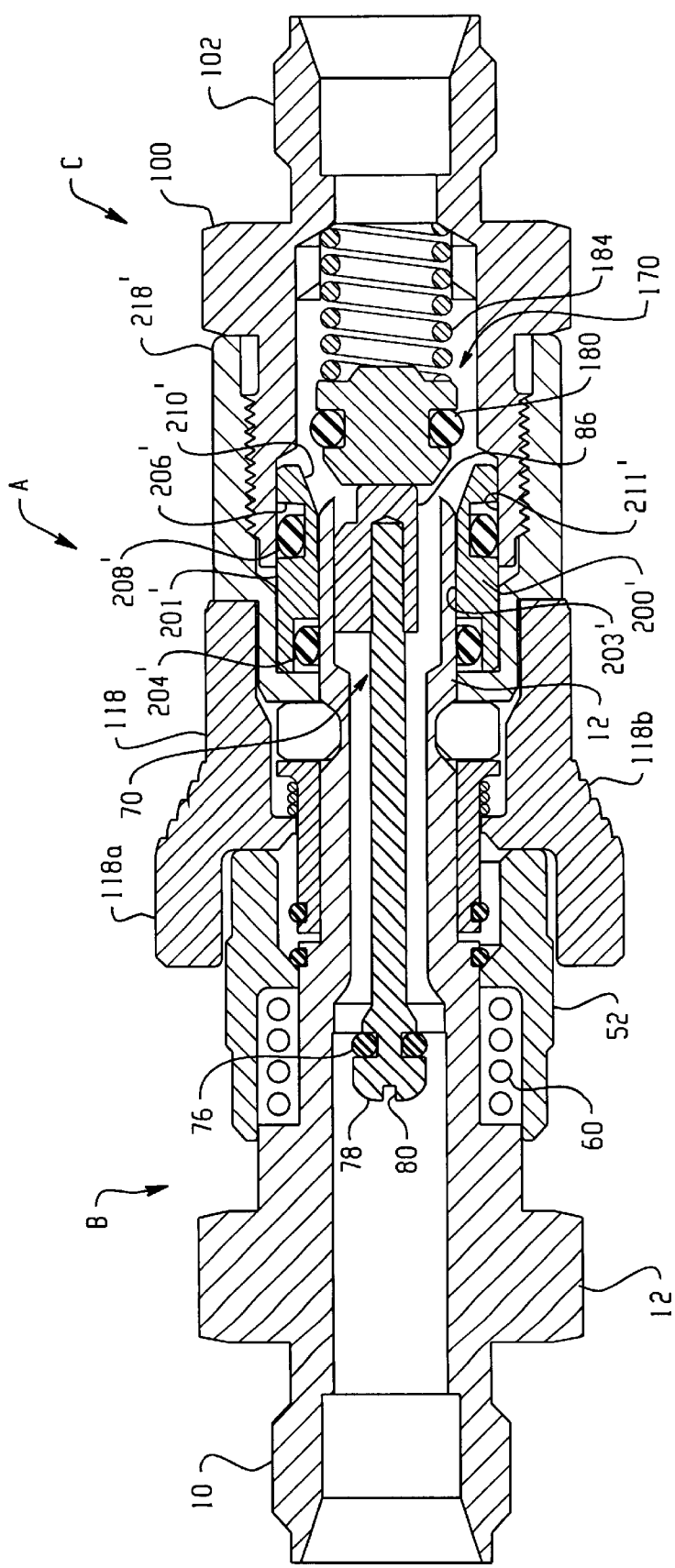
FIG. 1 is a quick connect coupling in accordance with the invention, shown in longitudinal cross-section.
Figure 2:
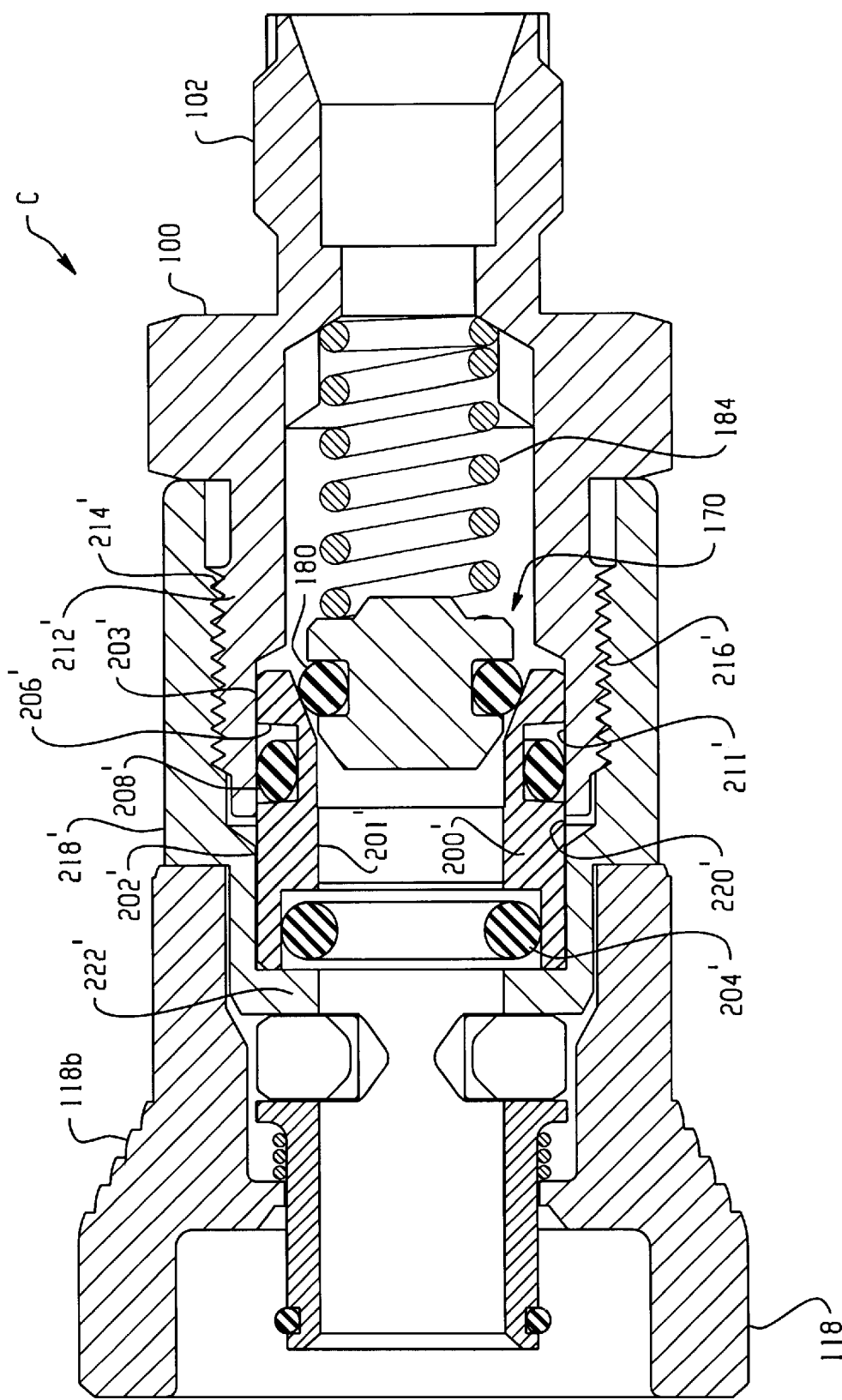
FIG. 2 is an illustration of the female coupling component of the quick connect coupling of FIG. 1 in an uncoupled condition, shown in longitudinal cross-section.

With reference to FIGS. 1 and 2, the invention will be described herein in an exemplary manner as being incorporated into a quick connect coupling of the type described in the above-incorporated patent. The present invention reduces manufacturing costs by eliminating one of the o-ring seals associated with the seat member 146, and makes the extension 104 easier to machine by eliminating sealing surfaces. The present invention may be incorporated into a single ended or double ended shut off coupling design.

FIGS. 1 and 2 hereof illustrate the invention embodied in a double ended shutoff configuration of a quick connect coupling, similar to FIG. 5 of the '028 patent. FIG. 2 hereof is an enlarged view of the female coupling portion of the quick connect coupling of FIG. 1 illustrated in the uncoupled condition (i.e. the poppet valve is closed). Many of the components illustrated in FIGS. 1 and 2 hereof are identical or very similar to and perform identical or very similar functions as the corresponding components in the '028 patent and reference may be made to the '028 patent for such description. For clarity, like components are given like reference numerals, and a prime (') is used to identify the modified components that embody the new invention in the exemplary form of FIGS. 1 and 2 hereof. The modified features are intended to work within the assembly of the '028 patent and therefore most of the components are substantially the same.

The present invention modifies the seat member (element 146 of the '028 patent) and reduces the number of seat seals from three (elements 162, 164 and 166 in the '028 patent) to two. This reduction in the number of o-rings and the modified valve seat member result in a lower cost assembly. Note in FIG. 1 hereof that the sleeve 118 is different than in the '028 patent in that it includes a protective collar portion 118a and a gripping portion 118b to make disconnect easier.

The quick connect coupling A thus includes a male coupling portion B and a female coupling portion C. All of the modifications having to do with the present invention are in the female coupling portion C. In particular, the valve seat member is now realized in the form of a generally cylindrical sleeve-like insert 200'. The valve seat member has a generally cylindrical outer surface 201' and a generally cylindrical inner surface 203'. The valve seat member 200' includes a first radially inward recess 202' formed in the inner surface 201' that receives a first seal 204'. The recess 202' may be formed, for example, as a counterbore at one end of the valve seat member 200'. The valve seat member 200' further includes a second radially outward recess 206' formed in the outer surface 203' and that receives a second seal 208'. In the illustrated embodiment, o-rings are the preferred choice for the seals 204' and 208' but other seal designs may be used as required.

The insert 200' provides a tapered poppet valve seat area 210' at one end thereof. This tapered valve seat 210' cooperates with an o-ring 180 or other suitable seal on the poppet valve 170 to close the valve when the coupling portions B and C are not fully engaged and locked.

The female coupling portion C includes a hollow body 100, and the body 100' further includes an axial nose portion 212' that receives a portion of the insert 200'. When fully assembled, the insert 200' end that includes the valve seat area 210' fits within the nose portion 212' so that an inner surface 211' of the nose portion 212' and the second recess 206' cooperate to form an enclosed seal groove or pocket for the second seal 208'. Thus the seal surface 211' of the nose portion 212' is not externally exposed but is internally formed (in contrast to the seal surface 140 of the prior design).

The nose portion 212' includes exterior male threads 214' that cooperate with corresponding internal female threads 216' on a body extension 218'. The body extension 218' in this exemplary embodiment is threadably assembled onto the hollow body nose portion 212'. The body extension 218' includes an axial bore 220' that receives the other end of the insert 200' opposite the valve seat 210' end. The extension 218' further includes a radially inward shoulder 222'. This shoulder 222' cooperates with the first recess 202' and, when assembled with the male coupling portion B, an outer surface of the male coupling component tubular stem portion 12 to form a seal groove or pocket for the first seal 204'.

Because the second seal 208' is captured within a seal groove that is defined by the insert 200' second groove 206' and the nose portion 212', there is no need to machine a seal surface on the body extension 218'. The second seal is thus radially compressed between recess in the outer surface of the valve seat member 200' and the inner surface 211' of the nose portion 212'. The inner surface of the shoulder 222' can be formed as a counterbore that retains and supports the first seal 204' but does not need to provide a seal surface. Thus, in contrast to the prior design, the extension 218' is not a wetted component and has no surface required to seal thereby simplifying its machining.

In accordance with the invention, the valve seat member 200' is axially disposed within the female coupling component between two axially joined members, namely the tubular body extension 218' and the nose portion 212' of the female coupling hollow body. The valve seat member 200' provides a radial inner and radial outer seal function to eliminate a seal and simplify machining operations. The seals as positioned function to seal against backpressure and provide primary seals against leakage to the outside environment along the stem 12 or out through the threaded coupling between the body 100 and the body extension 218'.

Figure 3:
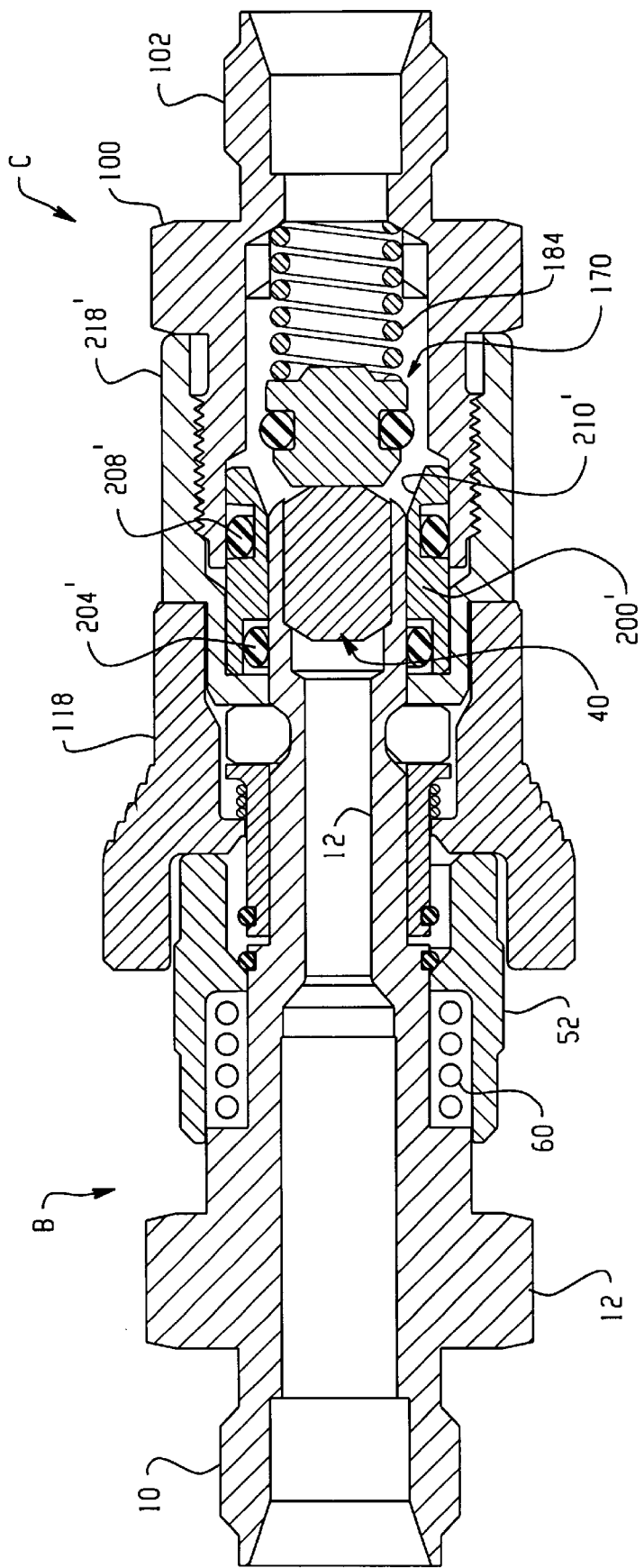
FIG. 3 is another embodiment of a quick connect coupling in accordance with the invention, shown in longitudinal cross-section.

FIG. 3 illustrates another embodiment of the invention, realized in a single ended shutoff (SESO) design. All of the components are substantially the same as in the double ended version of FIGS. 1 and 2 hereof, therefore, the description thereof need not be repeated. In the SESO version, however, the male coupling portion B does not include the second valve element 76/78 but rather only uses a valve opening means 40 as described in the '028 patent. This valve opening means 40 is used to axially displace the poppet valve 170 to open the valve when the male and female coupling portions B and C are fully engaged and locked together. The female portion C of the coupling, and in particular the valve seat member 200' and associated seals, are the same as in the embodiment of FIGS. 1 and 2.

The invention has been described with reference to the preferred and exemplary embodiments. Modifications and alterations will occur to others upon a reading and understanding of this specification. It is intended to include all such modifications and alterations insofar as they come within the scope of the claimed invention or the equivalents thereof.

Having thus described the invention, it is claimed:

1. In a quick connect coupling of the type having a male coupling component and a female coupling component that interfit in a locked and unlocked relationship with each other, the female coupling component having a hollow body, a tubular body extension that extends from a first end of the hollow body and a valve element that can translate along a longitudinal axis of the quick connect coupling, the male coupling component having a tubular stem portion that translates the valve element when the quick connect coupling is fully assembled to a locked position; the improvement comprising:

a valve seat member slideably received within the female coupling component;

said valve seat member having a generally cylindrical body with a generally cylindrical inner surface adapted to receive a first end of the male coupling component tubular stem portion, and said valve seat member having a generally cylindrical outer surface;

said inner surface at one end thereof having a tapered valve scat area that cooperates with the valve element;

a first recess formed in said inner surface, a first seal disposed in said first recess;

a second recess formed in said outer surface, and a second seal disposed in said second recess;

said tubular body extension being an unwetted component.

2. The quick connect coupling of claim 1 wherein said first recess is formed by a counterbore at an end of the valve seat member opposite said tapered valve seat area.

3. The quick connect coupling of claim 1 wherein said second recess comprises a circumferential seal groove.

4. The quick connect coupling of claim 1 wherein said first and second seals are o-rings.

5. The quick connect coupling of claim 1 wherein the valve element comprises a poppet valve having a valve seal disposed on a poppet.

6. The quick connect coupling of claim 1 wherein when the coupling components are connected in a locked position said first seal is radially compressed between a surface of said first recess and an outer surface of the tubular stem portion.

7. The quick connect coupling of claim 1 wherein said second seal is radially compressed between a surface of said second recess and an inner surface of the female coupling body.

8. The quick connect coupling of claim 7 wherein when the coupling components are connected in a locked position said first seal is radially compressed between a surface of said first recess and an outer surface of the tubular stem portion.

9. The quick connect coupling of claim 1 wherein said second seal is captured in an enclosed seal groove formed by said second recess and an inner surface of a nose portion of the female coupling component body.

10. The quick connect coupling of claim 1 wherein the coupling is a double ended shutoff coupling.

11. The quick connect coupling of claim 1 wherein the coupling is a single ended shutoff quick connect coupling.

12. A quick connect coupling comprising:

male coupling component and a female coupling component that axially interfit in a locked and unlocked relationship with each other, the female coupling component having a hollow body, a tubular body extension that extends axially from a first end of the hollow body and a valve element that can translate along a longitudinal axis of the quick connect coupling;

the male coupling component having a tubular stem portion that translates the valve element when the quick connect coupling is fully assembled to a locked position;

a valve seat member slideably received within the female coupling component;

said valve seat member having a generally cylindrical body with a generally cylindrical inner surface adapted to receive a first end of said tubular stem portion, and said valve seat member having a generally cylindrical outer surface;

said valve seat member inner surface at one end thereof having a tapered valve seat area that cooperates with the valve element;

a first recess formed in said valve seat member inner surface, a first seal disposed in said first recess;

a second recess formed in said valve seat member outer surface, and a second seal disposed in said second recess;

said tubular body extension being an unwetted component.

13. The quick connect coupling of claim 12 wherein said first recess is formed by a counterbore at an end of the valve seat member opposite said tapered valve seat area.

14. The quick connect coupling of claim 12 wherein said second recess comprises a circumferential seal groove.

15. The quick connect coupling of claim 12 wherein said first and second seals are o-rings.

16. The quick connect coupling of claim 12 wherein the valve element comprises a poppet valve having a valve seal disposed on a poppet.

17. The quick connect coupling of claim 12 wherein when the coupling components are connected in a locked position said first seal is radially compressed between a surface of said first recess and an outer surface of the tubular stem portion.

18. The quick connect coupling of claim 12 wherein said second seal is radially compressed between a surface of said second recess and an inner surface of a nose portion of the female coupling component hollow body.

19. The quick connect coupling of claim 18 wherein when the coupling components are connected in a locked position said first seal is radially compressed between a surface of said first recess and an outer surface of the tubular stem portion.

20. The quick connect coupling of claim 12 wherein said second seal is captured in an enclosed seal groove formed by said second recess and an inner surface of the female coupling component hollow body.

21. In a quick connect coupling of the type having a male coupling component and a female coupling component that interfit in a locked and unlocked relationship with each other, the female coupling component comprising:

a hollow body, a tubular body extension that extends from a first end of the hollow body and a valve element that can translate along a longitudinal axis of the quick connect coupling;

a valve seat member slideably received in the female coupling component, said valve seat member having a generally cylindrical body with a generally cylindrical inner surface adapted to receive a first end of the male coupling component tubular stem portion, and said valve seat member having a generally cylindrical outer surface;

said valve seat member inner surface at one end thereof having a tapered valve seat area that cooperates with the valve element;

a first recess formed in said inner surface, a first seal disposed in said first recess;

a second recess formed in said outer surface, and a second seal disposed in said second recess;

said tubular body extension being an unwetted component.

* * * * *

UNITED STATES PATENT AND TRADEMARK OFFICE
CERTIFICATE OF CORRECTION

PATENT NO. : 6,669,168 B2 Page 1 of 1
DATED : December 30, 2003
INVENTOR(S) : Gary Scheffel It is certified that error appears in the above-identified patent and that said Letters Patent is hereby corrected as shown below:

<u>Column 4,</u>
Line 7, please delete "scat" and insert -- seat --.

Signed and Sealed this

Sixteenth Day of March, 2004

JON W. DUDAS
*Acting Director of the United States Patent and Trademark Office*